United States Patent [19]
Edlund

[11] Patent Number: 5,385,353
[45] Date of Patent: Jan. 31, 1995

[54] SEALING ARRANGEMENT

[75] Inventor: Roy Edlund, Echterdingen, Germany

[73] Assignee: Busak and Luyken GmbH & Co., Germany

[21] Appl. No.: 241,068

[22] Filed: May 11, 1994

Related U.S. Application Data

[63] Continuation of Ser. No. 924,021, Aug. 20, 1993.

[30] Foreign Application Priority Data

Feb. 28, 1990 [DE] Germany .............................. 4006258

[51] Int. Cl.⁶ ............................................. F16J 15/32
[52] U.S. Cl. .................................. 277/188 R; 277/165; 277/168
[58] Field of Search ................. 277/188 R, 188 A, 50, 277/165, 177, 168, 169, 207 R, 170, 173, 178, 184, 214

[56] References Cited

U.S. PATENT DOCUMENTS

| | | | |
|---|---|---|---|
| 2,456,356 | 12/1948 | Aber | 277/177 |
| 2,521,248 | 9/1950 | Parker . | |
| 2,898,167 | 8/1959 | Tanner . | |
| 3,269,737 | 8/1966 | Freese | 277/177 |
| 3,716,245 | 2/1973 | Turolla | 277/188 R |
| 3,970,321 | 7/1976 | Dechavanne | 277/165 |
| 4,342,463 | 8/1982 | Burke | 277/177 |
| 4,749,201 | 6/1988 | Hunger | 277/188 A |

FOREIGN PATENT DOCUMENTS

| | | | |
|---|---|---|---|
| 1227387 | 3/1959 | France . | |
| 1449218 | 10/1965 | France . | |
| 1881818 | 3/1961 | Germany . | |
| 2931603 | 8/1979 | Germany | F16J 15/16 |
| 3443220 | 11/1984 | Germany | F16J 15/16 |
| 417250 | 10/1964 | Switzerland . | |
| 1075111 | 7/1967 | United Kingdom | 277/188 A |
| 1471580 | 7/1974 | United Kingdom | F16J 15/16 |

OTHER PUBLICATIONS

O+P Ölhydraulik und Pneumatik 21 (1977), No. 11, pp. 781-784: Wallburg, G.: Elastomere Reibung bei O-Ring-Dichtungen (no month available).
India Rubber World, vol. 125, No. 5, Feb. 1952, pp. 575-581, New York, U.S.
McCuistion, T. J.: "A new rotary seal for high-speed and hig-pressure applications".

Primary Examiner—Daniel G. DePumpo
Attorney, Agent, or Firm—Walter A. Hackler

[57] ABSTRACT

A sealing arrangement for sealing a gap (11) between two concentric machine elements which can relatively move with respect to each other, the first machine element (3) having a smooth contact surface (5) and the second machine element (4) having a profiled section (6) which faces the contact surface (5) of the first machine element (3), accommodates a sealing ring (2). The profiled section (6) is bounded by a first flank (8) and a second flank (9). The sealing ring has a curved peripheral surface (7) and a radial surface (13), either of which may be completely exposed to the high pressure side. A sealing edge (10) of the sealing ring (2) is formed by the line of intersection of a conical surface (14) and the curved peripheral surface (7). The conical surface (14) merges into the radial surface (13). The sealing ring of the invention has a defined pressing distribution and, if the curved peripheral surface (7) faces the high-pressure side, the whole surface of the sealing ring is pressed positively against the second flank (9) by a pressurized medium.

10 Claims, 2 Drawing Sheets

SEALING ARRANGEMENT

This is a continuation of copending application Ser. No. 07/924,021, filed on Aug. 24, 1992, now abandoned.

BACKGROUND AND SUMMARY OF THE INVENTION

The present invention relates to a sealing arrangement for sealing the gap between two concentric machine. elements which can move relative with respect to each other, the first machine element having a smooth contact surface and the second machine element having a profiled section which faces the contact surface of the first machine element and comprises a first flank, a second flank and a groove bottom which links the flanks, with a sealing ring which is axially fixed with respect to the second machine element by means of the profiled section and abuts sealingly at the contact surface of the first machine element, wherein the sealing ring is provided with a sealing edge and the sealing ring has a semi-circular cross-section.

Such a sealing element has become known from a publication in "India Rubber World", volume 125, No. 5, February 1952, pages 575 to 578, 581, New York, U.S.; T. J. McCuistion: "A new Rotary Seal for High-Speed and High-Pressure Applications".

O-rings of elastic materials are used as sealing elements per se or as spring elements for combination sealing arrangements. They can be exposed to axially and/or radially directed deformation forces. Although the O-ring is the smallest sealing element with respect to cross-section, the installing space is sometimes toleranced so closely that only O-rings of a small circumference can be implemented for sealing oscillating machine parts. The degree of deformation or pressing of the O-ring results in the sealing force. The reaction force due to the deformation and the pressure of the medium to be sealed sum up to the pressing force necessary for the seal. Yet if the circumference of the seal is small and the installing groove is manufactured inaccurately, the thus possibly resulting difficulties cannot be offset by a higher pressuring of the circumference's cross-section, because to do so a greater circumference would be needed. However, the installing conditions exclude the use of O-rings with a greater circumference.

The known sealing element is used as a rotary seal according to the teaching of the publication. The pressurized medium acts on the plane surface of the sealing element as shown. A pressure relief of the sealing element by the medium itself is not possible with this arrangement. There also exists the danger that the known sealing element moves with the rotating machine part. The known sealing element cannot be used to seal reciprocating machine parts.

Therefore it is the object of the present invention to develop a sealing element of the kind described above in such a way that it abuts on a surface to be sealed with a pressuring maximum and a small contact surface.

According to the present invention this object is solved in that the sealing edge has a conical surface open to the second flank or a first axially directed surface section and a second radially directed surface section relative to the sealing ring's axis, said second surface section facing the second flank.

Thus the sealing element according to the present invention has the considerable advantage that the sealing edge abuts at the surface to be sealed in a particularly friction-low manner. Thus an efficient sealing can be achieved to the detached machine part as well as to the groove bottom. The sealing element according to the present invention faces the high-pressure side either with a symmetrically designed peripheral surface or with a radially directed plane surface. Thus a deformation of the sealing ring under pressure can be effectively compensated. The sealing edge according to the present invention has the advantage that it can flow due to its plastic deformation when inserted without losing its originally intended shape. Thus an efficient sealing edge is kept still after the installation. If the sealing edge according to the present invention is pressurized and if reciprocating parts are sealed against each other, medium can be transferred from the low-pressure region to the high-pressure region due to the peripheral surface curved to the sealing edge. If the plane surface across from to the curved peripheral surface faces the high-pressure side, preferably reciprocating machine parts are sealed against each other. If this is the case, the plane surface of the sealing ring is separted from the flank and the sealing ring abuts with its curved peripheral surface at the opposing flank which faces the low-pressure side.

Moreover, the sealing arrangement according to the present invention has the advantage that it can be retrofit and can be fitted in the smallest profiles. Forms which are already available for the manufacture of O-rings can also be used for the production of the sealing element according to the present invention when equipped with minor changes. If the sealing ring according to the present invention has a semi-circular cross-section, half, viewed axially, of the originally needed fitting space can be saved. The large groove depth can be maintained. Thus a permanent pressure deformation can be compensated better. In pre-determined rectangular grooves, sealing rings according to the present invention can be inserted, which have a considerably larger diameter relative to the diameter of the rings with a round circumference when compared to the sealing rings with a round circumference as used previously. As a result, considerably greater sealing forces can be achieved thanks to the sealing ring according to the present invention compared to the known one. The sealing ring which is semi-circular in its cross-section can also be produced with the already existing forms for O-rings by using only one half of a production form and applying a plane smooth plate as counterpart to cover the correspondingly profiled half.

If the sealing ring according to the present invention is made of rubber elastic material, it can be used everywhere where the known O-rings are used for sealing machine parts. It is advantageous with the sealing ring according to the present invention that it needs less space compared to the known O-rings and that a sealing edge is also fashioned in the sealing ring according to the present invention compared to the common O-rings. If the sealing ring according to the present invention is made of tough elastic material it obtains its sealing force from the elastic deformation of a pre-stressing element with which the sealing ring made of tough elastic material cooperates. The pre-stressing element may be a rubber elastic stressing ring or stressing rings or a coil spring, hose spring or leaf spring. If the sealing ring is made of the tough elastic material polyurethane, the pre-stressing element may be left out.

For stabilizing the sealing ring according to the present invention a support ring of metal, ceramics or another material which is harder than the sealing ring may be used. By means of the support ring, the sealing ring is stabilized. Moreover, one or several support rings prevent a flowing or deformation of the sealing ring material under pressure. The support ring is stiff and hard when compared to the sealing ring made of elastic material and contributes to the form stability of the sealing ring. Therefore several support rings which respectively support sub-sections of the sealing ring can be preferable.

At its sealing edge, seen cross-sectionally, opposite to the curved peripheral surface, the sealing rings may also have a first and second surface section designed radially and axially to the sealing ring's axis and which discharge pressure from the sealing ring depending on the size of the design of these surface sections, when the pressurized medium abuts at these surface sections.

The sealing arrangement according to the invention thus lives up to all extended requirements which occur in the field of sealing technology. The sealing ring may be accommodated in axially tight and deep rectangular grooves, but it can also be fitted in other grooves, such as a trapezoidal or triangular groove. If the sealing ring according to the present invention is used instead of a O-ring, the material savings are considerable and the sealing ring according to the invention is also cheaper to be manufactured. Moreover, the surface of the sealing ring according to the present invention may be finished or a lubricant may be added to the material. The sealing ring may also be used as rotary seal in hydraulics or as hydraulic seal with axial movements.

Further advantages will become apparent from the description and the enclosed drawings. The features mentioned above and the features additionally mentioned may be used in other embodiments of the invention each individually or in any combination thereof.

BRIEF DESCRIPTION OF THE DRAWINGS

The invention is shown in the drawing and is explained in more detail by the embodiments.

DESCRIPTION OF THE PREFERRED EMBODIMENT

Figure 1A:
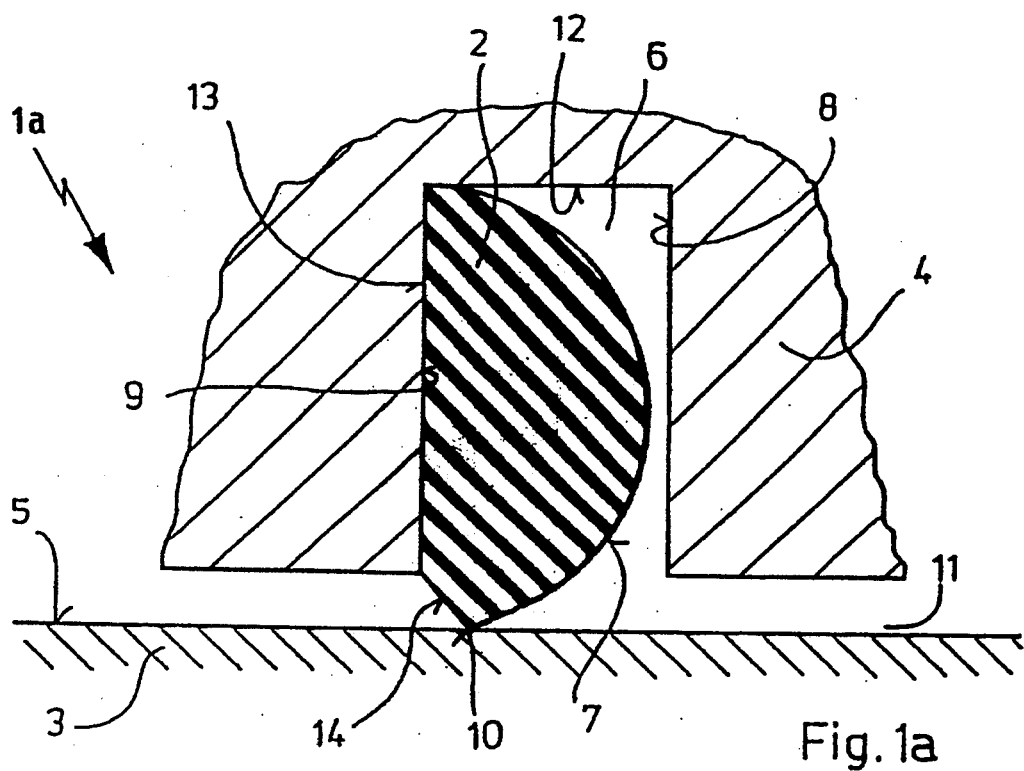
FIG. 1a shows a sealing arrangement according to the present invention with a semi-circular sealing ring and a sealing edge according to the present invention.

The individual figures of the drawing show the object of the present invention partly very schematically and are not to be taken to scale. The objects of the individual figures are shown in such a way that their structure can be shown best.

FIG. 1a shows a sealing arrangement 1, in the embodiment shown it is a an arrangement for rotational sealing, in which a sealing ring 2 made of a rubber elastic material abuts at a first machine element 3 and is fixed in its position by a second machine element 4. The first machine element 3, e.g. a shaft, has a smooth contact surface 5 and the second machine element 4 is provided with a profiled section 6. The sealing ring 2 is arranged in the profiled section 6, which is here a rectangular groove. The sealing ring 2 has its curved peripheral surface 7 separated from a first flank 8 of the profiled section 6, and abuts over its entire surface with a second flank 9 of the profiled section 6. Via a sealing edge 10 a gap 11 is sealed between the first and second machine elements 3, 4 which move relative to one another. A groove bottom 12 which links the first flank 8 with the second flank 9 limits the depth of the profiled section 6. The sealing ring 2 abuts with a radially directed plane surface 13 over its total surface at the second flank 9. The sealing edge 10 is formed by the intersection line of the curved peripheral surface 7 and a conical surface 14 which merges in the radially, here vertically, directed surface 13. The radial extension of the sealing ring 2 extends from the groove bottom 12 to the contact surface 5. In the fitted condition the sealing ring 2 is pre-stressed in the profiled section 6. The sealing ring 2 is made of a rubber elastic material, an elastomer.

If the machine element 3 moves axially to the machine element 4 (reciprocating movements) the sealing ring 2 abuts with its curved peripheral surface 7 at the first flank 8. The pressurized medium acts on the surface 13 and a space results between the second flank 9 and the surface 1.

Figure 1B:
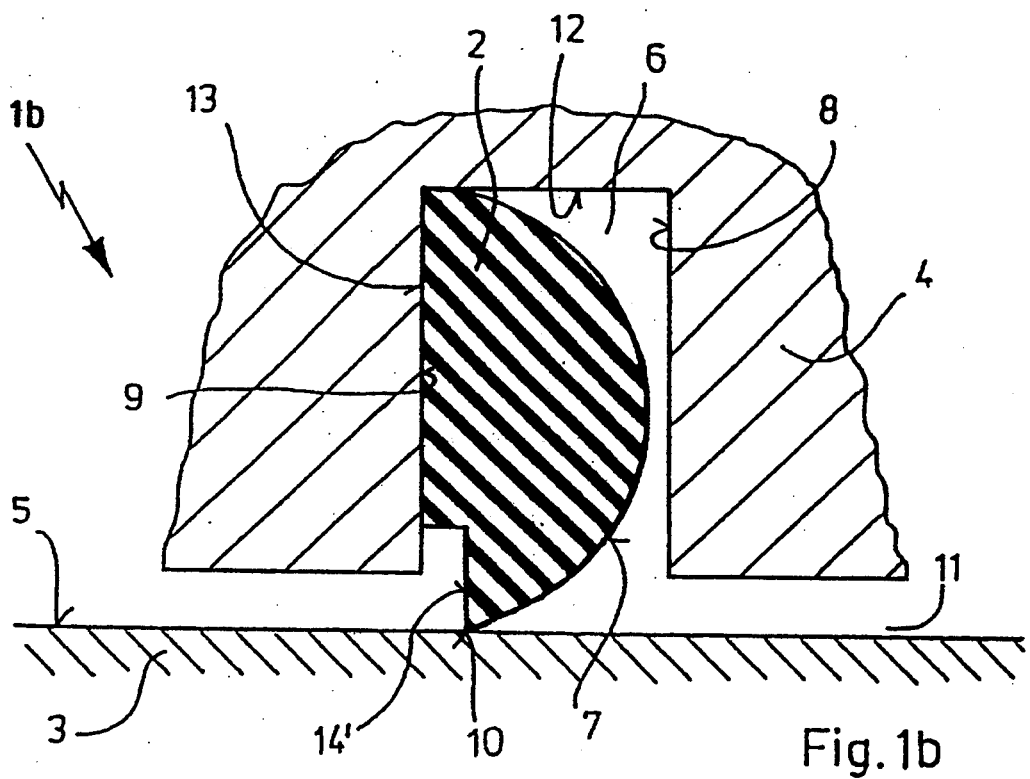
FIG. 1b shows an alterante emobidment of the present invention.

A second sealing edge embodiment according to the present invention is shown in FIG. 1b which includes a sealing surface 14', as it may be designed facing the second flank 9.

It should be appreciated that in FIGS. 1a and 1b like references, numerals or characters refer to identical or corresponding parts.

Figure 2:
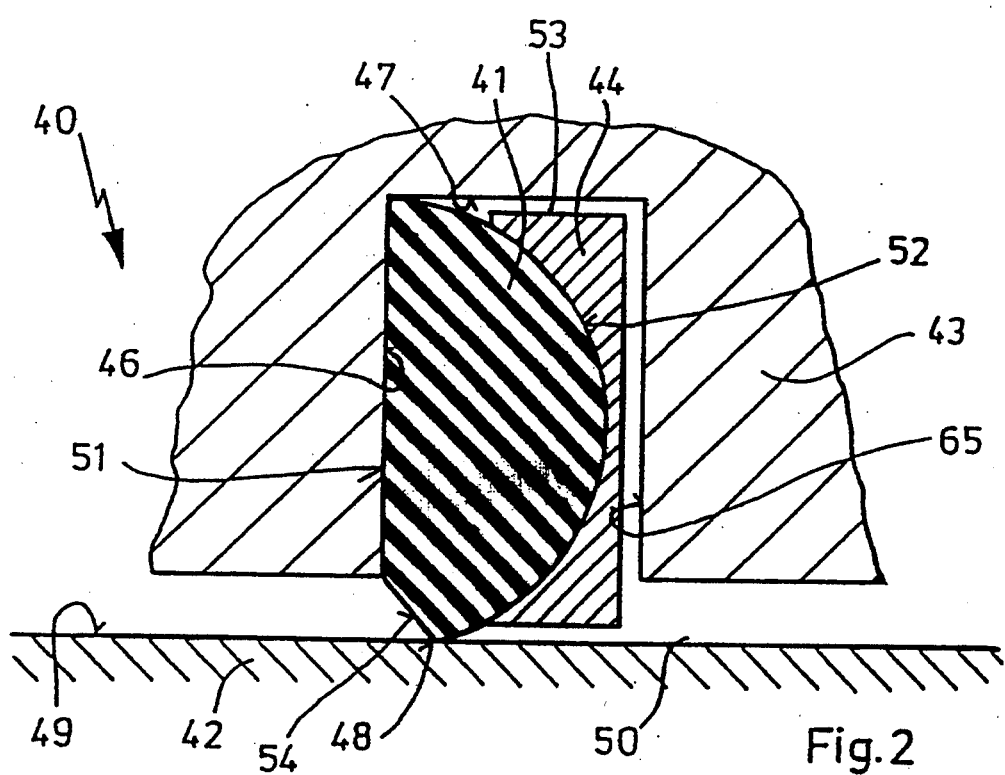
FIG. 2 a sealing arrangement according to the present invention with a sealing ring semi-circular in cross-section, with a sealing edge according to the invention and a support ring.

FIG. 2 shows a sealing arrangement 40 with a sealing ring 41, a first machine element 42 and a second machine element 43, the sealing ring 41 being held by a support member 44. The support member 44 is designed as support ring. The rubber-elastic sealing ring 41 and a substantially non-deformable support ring 44 are fixedly held in a rectangular groove which has a first flank 45, a second flank 46 and a groove bottom 47. The support ring 44 is separated from the first flank 45. The rectangular groove is open to the first machine element 42. A gap 50 between the first and second machine element 42, 43 is sealed by a sealing edge 48 which faces a contact surface 49 of the first machine element 42.

The sealing ring 41 abuts with a, perpendicular to the axis of the sealing ring 41, surface 51 at the second flank 46. The sealing ring 41 also abuts at the groove bottom 47. The support member 44 is formed in such a way that it abuts over a wide portion of a curved peripheral surface 52 of the sealing ring 41. At its opposite surface the support element 44 is separated from the first flank 45. The support ring 44 is also separated from the groove bottom 47 and the contact surface 49. In the pressurized condition the support ring 44 faces the high-pressure side and the radially, here vertically, directed surface 51 faces the low-pressure side. The sealing ring 41, as shown in FIG. 1, may also be fitted without support member 44 in a profiled section 53, which is here provided as a rectangular groove. The sealing edge 48 ends at a conical surface 54 which is open to the low-pressure side.

With the support ring 44 the sealing arrangement according to FIG. 2 may be used as rotary seal as well as a shaft seal for reciprocating movements.

The pressurized medium can abut either at the support ring, as shown in FIG. 2, or the pressurized medium abuts at the surface 51. In this case the second flank 46 is spaced apart from the surface 51.

A sealing arrangement for sealing a gap 11 between two concentric machine elements which can move relative to each other, of which the first machine element has a smooth contact surface and the second machine element has a profiled section, accommodates a sealing ring 2. The profiled section 6 is bordered by a first flank 8 and a second flank 9. The sealing ring 2 has a curved peripheral surface 7 as well as a radial surface 13, either of which may completely face the high pressure side. A sealing edge 10 of the sealing ring 2 is formed by the line of intersection of a conical surface 14 and the curved peripheral surface 7. The conical surface 14 merges into the radial surface 13. The sealing ring according to the invention has a defined compression distribution and if the curved peripheral surface 7 faces the high-pressure side the whole surface of the sealing ring 2 is pressed positively against the second flank 9 by a pressurized medium.

I claim:

1. A sealing arrangement for sealing a gap between two concentric machine elements which can relatively move with respect to each other, said sealing arrangement comprising:
   a first of the two machine elements having a contact surface;
   a second of the two machine elements having a profiled section;
   the profiled section facing the contact surface of the first machine element and comprising a first flank, a second flank and a groove bottom, said groove bottom linking the first with the second flank;
   a sealing ring being axially fixed in regard to the second machine element by means of the profiled section and seats at the contact surface of the first machine element;
   said sealing ring having a substantially semicircular cross-section and comprising a curved peripheral surface, a radial surface, and a diagonal surface between said radial surface and said curved peripheral surface, said diagonal surface extending away from said second flank towards said contact surface to form a sealing edge between said diagonal surface and said curved peripheral surface at said contact surface.

2. Sealing arrangement according to claim 1, wherein the sealing ring is manufacturable of a rubber elastic material.

3. Sealing arrangement according to claim 1, wherein a support element abuts at least one of the curved peripheral surface, the radial surface, and the diagonal surface of the sealing ring.

4. Sealing arrangement according to claim 3, wherein the support element is adaptable to the curved peripheral surface of the sealing ring.

5. Sealing arrangement according to claim 1, wherein the sealing ring abuts at the second flank.

6. A sealing arrangement for sealing a gap between two concentric machine elements which can relatively move with respect to each other, said sealing arrangement comprising:
   a first of the two machine elements having a contact surface;
   a second of the two machine elements having a profiled section, the profiled section facing the contact surface of the first machine element and comprising a first flank, a second flank and a groove bottom, said groove bottom linking the first with the second flank, a sealing ring being axially fixed in regard to the second machine element by means of the profiled section and seats at the contact surface of the first machine element, said sealing ring having a substantially semicircular cross-section and comprising a curved peripheral surface, a radial surface, and a notch surface between said radial surface and said curved peripheral surface, said notch surface having a first side substantially perpendicular to said second-flank and a second side substantially perpendicular to said contact surface to form a sealing edge between said notch surface and said curved peripheral surface at said contact surface.

7. Sealing arrangement according to claim 6 wherein the sealing ring is manufacturable of a rubber elastic material.

8. Sealing arrangement according to claim 6 wherein a support element abuts at least one of the curved peripheral surface, the radial surface, and the notch surface of the sealing ring.

9. Sealing arrangement according to claim 8 wherein the support element is adaptable to the curved peripheral surface of the sealing ring.

10. Sealing arrangement according to claim 6 wherein the sealing ring abuts at the second flank.

* * * * *